Patented July 25, 1944

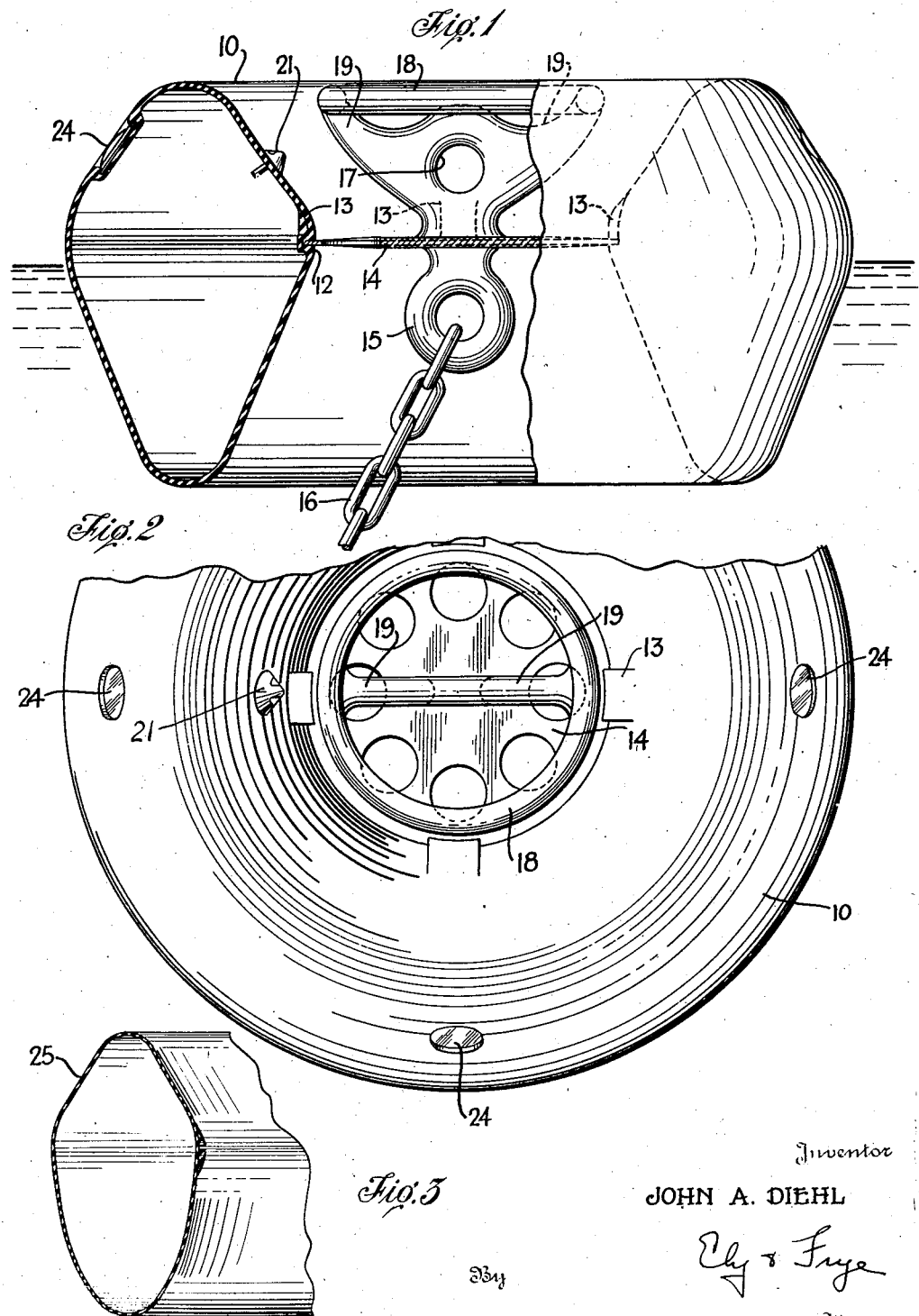

2,354,441

UNITED STATES PATENT OFFICE 2,354,441

MOORING BUOY

John A. Diehl, Akron, Ohio, assignor to The Firestone Tire & Rubber Company, Akron, Ohio, a corporation of Ohio Application April 2, 1942, Serial No. 437,458

6 Claims. (Cl. 9—8)

This invention relates to mooring buoys, and more especially it relates to mooring buoys for marine and amphibian aircraft.

In order to reduce the weight of marine aircraft, and thereby to increase the useful load that they may carry, it is customary to construct the hulls of seaplanes and the pontoons of amphibian planes of thin, light weight material. Such material is easily fractured or otherwise damaged by impact with floating objects of unyielding material, and heretofore even floating mooring buoys have constituted a serious hazard such as to require skillful maneuvering of floating aircraft to avoid them.

The chief object of this invention is to provide an improved mooring buoy for marine aircraft that will not damage the latter in case of collision therewith. Other objects of the invention are to provide a mooring buoy of the character mentioned that is readily deformable under direct impact; that will spin or rotate upon tangential impact; that comprises a metal anchoring member for connection to the mooring lines of aircraft, which member is so located as not to come into contact with aircraft bodies or wing tips under any conditions; to provide a mooring buoy that will be difficult to disable even by deliberate mutilation, for example, by gun shots; and to provide a hollow mooring buoy with means for easily and quickly adjusting the internal pressure therein. It is a further object of the invention to obviate the necessity for marine aircraft to avoid collision with mooring buoys. Other objects will be manifest as the description proceeds.

Of the accompanying drawing:

Fig. 1 is a side elevation, partly in section, of a mooring buoy embodying the invention;

Fig. 2 is a plan view of the improved buoy; and

Fig. 3 is a fragmentary sectional view of a mooring buoy of somewhat different shape.

Referring to Figs. 1 and 2 of the drawing there is shown a mooring buoy comprising a hollow buoyant body 10 of torus shape and which is composed of rubber or rubber-like composition. The hollow body 10 is designed to maintain its normal shape without internal pressure, and the wall thereof is adequately thick to accomplish this purpose, although some light-weight reinforcing may be employed if desired. In transverse section the shape of the torus is that of a pair of reversed cones with contiguous bases and rounded apices, the largest diameter of the torus being nearer the top thereof than the bottom when the torus is disposed in a horizontal plane. The arrangement imparts greater visibility to the buoy, when a landing is made into the sun.

Substantially in its plane of greatest diameter, the hollow body 10 is formed on its inner circumference with a circumferential shelf or ledge 12, and overhanging said ledge, in spaced relation thereto, are a plurality of lugs or lips 13, 13 herein shown as four in number. Supported upon the ledge 12 and retained thereon by the lugs 13 is the disc or spider 14 of the anchoring member of the buoy. Said member 14 is composed of metal, and is integrally formed on its under side with an eye 15 to which is connected one end of a chain 16, the other end of the latter being secured to an anchor (not shown) that rests upon the bottom of the waterway and retains the buoy in its proper location. Integrally formed on the upper side of the spider 14 is an eye 17, and a grab ring 18 that is supported by a pair of arms 19, in parallelism with said spider and in axial alignment therewith. The grab ring 18 and eye 17 provide means by which a line from a marine aircraft may be secured to the buoy. An important feature of the invention is the location of the grab ring 18 which is just below the top of the buoy. The arrangement is such as to prevent the grab ring from coming into contact with hull or pontoon of a seaplane even though the latter should pass directly over the top of the buoy and temporarily submerge the latter. For this reason it is not necessary for aircraft to maneuver to avoid collision with the buoy since no damage can result from such collision.

The buoy is designed to operate at zero pressure, that is, the internal pressure is the same as atmospheric pressure. To this end the wall of the buoy body 10 is provided with a manually operable relief valve 21 that is located above the water line of the buoy and in the inner circumferential wall thereof. The provision of the valve 21 is essential since the barometric pressure at points where the buoy is to be used probably is different from the barometric pressure at the place where the buoy is manufactured. The valve is located in a protected place where it can not easily be damaged, and may be of any known or preferred design.

The buoy may be painted with stripes of contrasting colors for greater visibility in daytime. To improve visibility at night, a plurality of bull's-eye reflectors 24, 24 are mounted in respective recessed sockets formed in the outwardly presented wall of the buoy, above the water line, Said sockets do not extend through the wall of the body 10, and therefore do not admit water to the interior thereof. Furthermore, the sockets are formed sufficiently below the outer surface of the buoy body that the reflectors do not project above said surface, and therefore are not in danger of damage from collision with floating craft.

The feature of employing a hollow buoyant body at atmospheric or zero pressure is advantageous in enabling the buoy to function in spite of damage thereto. Thus the puncturing of the buoy above the water line, as by a bullet, would have no immediate effect upon its ability to float. If punctured below the water line, water would enter, but air entrapped in the upper part of the buoy would keep it afloat. Furthermore, the absence of internal pressure in the buoy enables the body thereof to yield under impact and thereby to reduce the impact factor to the minimum. In fact, the impact factor will never exceed 17 ft. lbs. per sq. in. per sec. at 60 M. P. H. Thus the buoy can not possibly harm a craft that squarely collides with it.

If a craft collides tangentially with the buoy, the latter will spin about its axis by reason of the single axial connection with the anchor. The feature of having the grab ring and the anchoring eye integral parts of a single spider enables strain on the grab ring, as from a mooring line, to be transmitted directly to the anchor, with the result that no strain is imposed upon the buoyant body structure 10.

The invention results in superior buoy that does not obstruct the passage of marine aircraft, that can not damage the latter, and that achieves the other objects set out in the foregoing statement of objects.

In Fig. 3 is shown a hollow buoyant body 25 for mooring buoys such as that described, the body 25 being similar in all respects to the body 10 except that the cross-sectional shape thereof, below the region of greatest diameter of the body, is a hyperbolic conic section. The arrangement provides the body with greater volumetric capacity.

Other modifications may be resorted to without departing from the spirit of the invention, or the scope thereof as defined by the appended claims.

What is claimed is:

1. A mooring buoy of the character described comprising a hollow buoyant body of resilient impervious material and of torus form, a metal spider positioned parallel to the plane of said body and supported upon a ledge formed on the inner circumferential wall thereof, an axial anchoring eye formed on the bottom face of said spider, and a grab ring coaxial with said spider and integrally connected thereto on the upper side thereof, said grab ring being disposed entirely below the top of the buoy body.

2. A mooring buoy of the character described comprising a hollow buoyant body of resilient impervious material and of torus form, a metal spider supported upon a ledge formed on the inner circumferential wall thereof, means formed on one side of said spider for connection with an anchor, and means formed on the other side of said spider for connection with a mooring line, both of said means being disposed entirely between the top and bottom of said buoy body.

3. A mooring buoy of the character described comprising a hollow buoyant body of resilient impervious material and of torus shape, said body formed on its inner circumferential wall with a circumferential ledge and a plurality of lugs overhanging said ledge in spaced relation thereto, a circular spider positioned upon said ledge and retained thereon by said lugs, means formed on one side of said spider at the axis thereof for connection with an anchor, and means formed on the other side and at the axis thereof for connection with a mooring line.

4. A combination as defined in claim 3 wherein the means formed on opposite sides of the spider are disposed entirely between the top and bottom of the buoy body.

5. A mooring buoy of the character described comprising a hollow buoyant body of resilient material and of torus shape, the peripheral wall thereof being formed, above the water line, with a circumferential series of sockets that are closed to the interior of the body, and reflectors mounted in the respective sockets.

6. A combination as defined in claim 5 wherein the sockets are recessed so that the reflectors do not project beyond the surface of the body wall.

JOHN A. DIEHL.